United States Patent
Wang et al.

(10) Patent No.: US 12,125,266 B1
(45) Date of Patent: Oct. 22, 2024

(54) ANCHOR-FREE OBJECT DETECTION METHOD BASED ON ULTRAVIOLET IMAGE, STORAGE MEDIUM AND ELECTRICAL EQUIPMENT

(71) Applicants: State Grid Hubei Extra High Voltage Company, Hubei (CN); Hubei Superenergic Electric Power Co., Ltd., Hubei (CN)

(72) Inventors: Shenli Wang, Hubei (CN); Song Xie, Hubei (CN); Yong Du, Hubei (CN); Jiang Liu, Hubei (CN); Jun Wu, Hubei (CN); Yi Shi, Hubei (CN); Wei Zhao, Hubei (CN); Qian Wang, Hubei (CN)

(73) Assignees: State Grid Hubei Extra High Voltage Company, Hubei (CN); Hubei Superenergic Electric Power Co., Ltd., Hubei (CN)

( * ) Notice: Subject to any disclaimer, the term of this patent is extended or adjusted under 35 U.S.C. 154(b) by 0 days.

(21) Appl. No.: 18/770,930

(22) Filed: Jul. 12, 2024

(30) Foreign Application Priority Data

Oct. 31, 2023 (CN) .......................... 202311429453.1

(51) Int. Cl.
  *G06V 10/774* (2022.01)
  *G06V 10/20* (2022.01)
  (Continued)

(52) U.S. Cl.
  CPC ............ *G06V 10/774* (2022.01); *G06V 10/20* (2022.01); *G06V 10/7715* (2022.01);
  (Continued)

(58) Field of Classification Search
  CPC .. G06V 10/774; G06V 10/20; G06V 10/7715; G06V 10/776; G06V 20/50; G06V 20/70
  See application file for complete search history.

(56) References Cited

U.S. PATENT DOCUMENTS

| | | | |
|---|---|---|---|
| 2011/0273560 A1* | 11/2011 | Shong ................... | G01N 21/88 348/135 |
| 2021/0176434 A1* | 6/2021 | Birchbauer .............. | H04N 7/18 |
| 2021/0365724 A1* | 11/2021 | Lee .......................... | G06T 7/73 |

FOREIGN PATENT DOCUMENTS

| | | |
|---|---|---|
| CN | 110347839 A | 10/2019 |
| CN | 111461127 A | 7/2020 |

(Continued)

OTHER PUBLICATIONS

Wang et al. "Evaluation method for the corona discharge of insulator based on convolution neural network with the dual-spectra camera" published Oct. 2020 (Year: 2020).*

(Continued)

*Primary Examiner* — Ming Y Hon
(74) *Attorney, Agent, or Firm* — Cooper Legal Group, LLC

(57) ABSTRACT

An anchor-free object detection method based on ultraviolet image includes: obtaining a ground-truth label of object detection, two label boxes corresponding to the two labels; obtaining a masked label based on the two labels and the two label boxes in the train set, and performing a same enhancement processing on the train set and the masked label; constructing an anchor-free object detection model including an encoding part, a decoding part and a detection head part including three detection heads, namely two anchor-free detection heads and one anchor-free dual-head detection head, and the dual-head of the anchor-free box dual-head detection head is an anchor-free detection head and an auxiliary detection head, respectively; training the model based on the enhanced train set and the enhanced masked label; and inputting the ultraviolet image data to be detected into the final anchor-free object detection model, to obtain an object detection result.

7 Claims, 4 Drawing Sheets

(51) Int. Cl.
*G06V 10/77* (2022.01)
*G06V 10/776* (2022.01)
*G06V 20/50* (2022.01)
*G06V 20/70* (2022.01)

(52) U.S. Cl.
CPC ............ *G06V 10/776* (2022.01); *G06V 20/50* (2022.01); *G06V 20/70* (2022.01)

(56) References Cited

FOREIGN PATENT DOCUMENTS

| | | |
|---|---|---|
| CN | 112884037 A | 6/2021 |
| CN | 114118247 A | 3/2022 |
| KR | 20210143401 A | 11/2021 |
| WO | 2021129691 A1 | 7/2021 |
| WO | 2023116507 A1 | 6/2023 |

OTHER PUBLICATIONS

Sun, X., et al., "Threatening Patch Attacks on Object Detection in Optical Remote Sensing Images", IEEE Transactions on Geoscience and Remote Sensing, Feb. 13, 2023, vol. 61, pp. 1-10.

Wu, J., et al., "Transmission Line Small Target Defect Detection Method Based on Cascade R-CNN Algorithm", Power System and Clean Energy, Apr. 2022, vol. 38, No. 4, pp. 19-36.

\* cited by examiner

ANCHOR-FREE OBJECT DETECTION METHOD BASED ON ULTRAVIOLET IMAGE, STORAGE MEDIUM AND ELECTRICAL EQUIPMENT

CROSS-REFERENCE TO RELATED APPLICATION

The present application is based on and claims the priority benefits of China application No. 202311429453.1, filed on Oct. 31, 2023. The entirety of China application No. 202311429453.1 is hereby incorporated by reference herein and made a part of this specification.

TECHNICAL FIELD

The present application relates to a technical field of image processing, and in particular, relates to an anchor-free object detection method based on ultraviolet image, a storage medium and an electrical equipment.

BACKGROUND ART

Corona discharge detection based on ultraviolet image is a technology configured to detect a phenomenon of corona discharge in the power equipment. Corona discharge refers to an ionization and discharge phenomenon of air molecules on or near a surface of the high-voltage power equipment due to too high electric field strength. Corona discharge not only causes energy loss and electromagnetic interference of the power equipment, but also may lead to equipment damage and accidents.

An ultraviolet image technology has important application value in the corona discharge detection. The ultraviolet image can capture ultraviolet radiation generated during the corona discharge, as the spectrum generated by the corona discharge is mainly concentrated in the ultraviolet band. By means of ultraviolet cameras and corresponding image processing algorithms, a real-time monitoring and analysis of the ultraviolet image on the surface of the power equipment can be achieved, thereby detecting and identifying the phenomenon of corona discharge.

The corona discharge detection technology based on ultraviolet image is widely applied in the power industry. By monitoring the ultraviolet images of the power equipment, the real-time monitoring and early-warning of the corona discharge can be achieved, thereby improving the safety and reliability of the power equipment. Meanwhile, this technology can further assist the power operation and maintenance personnel in equipment status assessment and fault diagnosis, to improve the maintenance efficiency and operational quality of the power equipment.

Some challenges and limitations still exist in the corona discharge detection technology based on ultraviolet image. For example, characteristics of the corona discharge are complex and diverse, it is necessary to design and optimize the algorithm for different types of corona discharge. In addition, noise and interference in the ultraviolet image may affect detection results, it is necessary to apply an appropriate image processing and analysis method for suppression and filtering. At the same time, the corona discharge appears as a small object with a high frequency in the ultraviolet image, currently, many algorithms have poor detection effects on the detection of the small object. It is necessary to design and optimize the algorithm to improve the detection effect of the small object.

SUMMARY

In order to involve the above problem, the present application provides an anchor-free object detection method based on ultraviolet image, including the following steps:

S1. collecting ultraviolet image data of an electrical equipment, preprocessing the ultraviolet image data, to obtain a ground-truth label of object detection, a label box corresponding to the ground-truth label of object detection, a ground-truth label of semantic segmentation and a label box corresponding to the ground-truth label of semantic segmentation, and dividing the preprocessed ultraviolet image data into a train set, a validation set and a test set;

S2. obtaining a masked label based on the ground-truth label of object detection, the label box corresponding to the ground-truth label of object detection, the ground-truth label of semantic segmentation and the label box corresponding to the ground-truth label of semantic segmentation in the train set, and performing a same enhancement processing on the train set and the masked label, S3. constructing an anchor-free object detection model, the anchor-free object detection model includes an encoding part, a decoding part and a detection head part, the encoding part includes a backbone feature extraction network and an atrous spatial pyramid pooling network configured for feature extraction, the detection head part has three detection heads, namely two anchor-free detection heads and one anchor-free dual-head detection head, and the dual-head of the anchor-free box dual-head detection head is an anchor-free detection head and an auxiliary detection head, respectively; and S4. training the anchor-free object detection model based on the enhanced train set and the enhanced masked label, verifying the trained anchor-free object detection model by the validation set, adjusting a hyperparameter of the anchor-free object detection model, evaluating the verified anchor-free object detection model by using the test set to obtain a final anchor-free object detection model, and inputting the ultraviolet image data to be detected into the final anchor-free object detection model, to obtain an object detection result.

Furthermore, in the S1, the label box corresponding to the ground-truth label of object detection is a rectangular label box, and the label box corresponding to the ground-truth label of semantic segmentation is a polygonal label box.

Furthermore, the S2 specifically includes: comparing the label box corresponding to the ground-truth label of object detection with the label box corresponding to the ground-truth label of semantic segmentation, to obtain an union set and an intersection set of the label box corresponding to the ground-truth label of object detection and the label box corresponding to the ground-truth label of semantic segmentation, a pixel point mask in a zone of an image of the train set where the union set is removed is set to 0, and a pixel point mask in a zone of the label box corresponding to the ground-truth label of object detection where the intersection zone is removed is set to 1; when the label box corresponding to the ground-truth label of object detection intersects with the label box corresponding to the ground-truth label of semantic segmentation and the ground-truth label of object detection is consistent with the ground-truth label of semantic segmentation, a pixel point mask in the intersection zone will be set to 2, and when the label box corresponding to the ground-truth label of object detection intersects with the label box corresponding to the ground-truth label of semantic segmentation while the ground-truth label of object detection is not consistent with the ground-truth label of semantic segmentation, the pixel point mask in the intersection zone is set to 3.

Furthermore, the backbone feature extraction network is a backbone feature extraction network based on VGG16 architecture constructed by atrous convolution.

Furthermore, the atrous spatial pyramid pooling network includes three convolutions, three atrous convolutions, four normalization layers, one global average pooling layer, one upsampling, one stacking layer and one batch normalization layer.

A first convolution and a first normalization layer constitute a first convolution unit, a first atrous convolution and a second normalization layer constitute a first atrous convolution unit, a second atrous convolution and a third normalization layer constitute a second atrous convolution unit, and a third atrous convolution and a fourth normalization layer constitute a third atrous convolution unit, The stacking layer has five inputs, an input of the atrous spatial pyramid pooling network after passing through an output of the first convolution unit is the first input of the stacking layer, after the first input of the stacking layer passes through the global average pooling layer, a first input of a pooled stacking layer is obtained, the first input of the pooled stacking layer, after undergoing a feature extraction by the second convolution, is upsampled to obtain a second input of the stacking layer, the first input of the stacking layer passes through the first atrous convolution unit, to obtain a third input of the stacking layer, the third input of the stacking layer passes through the second atrous convolution unit, to obtain a fourth input of the stacking layer, and the fourth input of the stacking layer passes through the third atrous convolution unit, to obtain a fifth input of the stacking layer.

The five inputs of the stacking layer pass through the stacking layer, to obtain stacked feature maps, the stacked feature maps undergo a feature extraction through the third convolution and pass through the batch normalization layer, such that a new feature is output from the atrous spatial pyramid pooling network.

Furthermore, the anchor-free detection head adopts two first ordinary convolution operations for feature adjustment, a number of channels of the anchor-free detection head is adjusted to C1 through one of the two first ordinary convolution operations, to obtain an output, the auxiliary detection head adopts two second ordinary convolution operations for feature adjustment, and a number of channels of the auxiliary detection head is adjusted to C2 through one of the two second ordinary convolution operations, to obtain an output.

The number of channels of the anchor-free detection head is C1=C+4+1, and the number of channels of the auxiliary detection head is C2=C+1, 4 represents four channels that store a position of a bounding box ($w_1$, $w_2$, $h_1$, $h_2$), $w_1$ represents a distance between a pixel point and a left border, $w_2$ represents a distance between a pixel point and a right border, $h_1$ represents a distance between a pixel point and a top border, $h_2$ represents a distance between a pixel point and a bottom border, 1 represents one channel that stores a deviation between a pixel point and a center point of a ground-truth box, C is a detectable object type, and stores a binary confidence of a corresponding type classification.

Furthermore, the detection head adopts two methods, namely NIoU and DIOU, to filter model forecast results and obtain final results, $$NIoU = \min(\cap_1, \cap_2)/\max(\cap_1, \cap_2) \times DIoU$$

wherein NIoU represents a composite intersection over union, $\cap_1$ represents an intersection part when a ground-truth box of the label box corresponding to the ground-truth label of object detection intersects with a ground-truth box of the label box corresponding to the ground-truth label of semantic segmentation and the ground-truth label of object detection is consistent with the ground-truth label of semantic segmentation, $\cap_2$ represents an intersection part when the ground-truth box of the label box corresponding to the ground-truth label of object detection intersects with the forecast box of the label box corresponding to the ground-truth label of semantic segmentation and the ground-truth label of object detection is consistent with the ground-truth label of semantic segmentation, and DIoU represents a distance intersection over union.

Furthermore, loss functions of the anchor-free object detection model include a loss function of anchor-free detection head and a loss function of auxiliary forecast head, the loss function of anchor-free detection head includes classification loss and bounding box loss, A binary loss function of a pixel point of the anchor-free detection head of the anchor-free dual-head detection head is:

$$F_L(P_1, P_p) = -\left(\alpha(1-P_p)^{\lambda_i} P_1 \log P_p\right) + \left((1-\alpha)(1-P_1)^{\lambda_1} P_p \log(1-P_p)\right)$$

$$P_p = P_{pre} \times (1 - \text{Drift}_{rate})$$

$$\text{Drift}_{rate} = \frac{1}{2}\left[\left(\frac{w_1 - w_2}{w_1 + w_2}\right)^2 + \left(\frac{h_1 - h_2}{h_1 + h_2}\right)^2\right],$$

wherein $P_p$ is a weighted output confidence of a pixel point, $P_{pre}$ is an output of the anchor-free detection head, $P_l$ is a ground-true label, $F_L(P_l, P_p)$ is the binary loss function of a pixel point, and $\alpha$ is a learnable balance parameter, $i \in (0,3)$, and by setting a hyperparameter $\lambda_i$ corresponding to mask 0-3, an attention of the anchor-free detection head of the anchor-free dual-head detection head to different zones is adjusted, $\text{Drift}_{rate}$ represents a deviation degree, $w_i$ represents a distance between a pixel point and a left border, $w_2$ represents a distance between a pixel point and a right border, $h_1$ represents a distance between a pixel point and a top border, and $h_2$ represents a distance between a pixel point and a bottom border.

The present application further provides a computer-readable storage medium, a computer program is stored in the computer-readable storage medium, and the anchor-free object detection method based on ultraviolet image mentioned above is implemented when the computer program is executed by a processor.

The present application further provides an electrical equipment, including a processor and a memory, the processor is interconnected with the memory, the memory is configured to store computer-readable instructions, and the processor is configured to call the computer-readable instructions, and execute the anchor-free object detection method based on ultraviolet image mentioned above.

The beneficial effects brought by the technical solution of the present application are as follows.

The present application adopts the atrous convolution to construct the backbone feature extraction network, which increases a receptive field without changing sizes of the feature maps, and improves the perceptual ability while maintaining spatial resolution. Before enhancing the train set, mask generation is performed, such that the mast can be similarly enhanced as the train set while enhancing the train set, to obtain a mask that matches with an enhanced data set, which is configured for loss function calculation in model training, the detection effect is improved by controlling the attention to different zones through mask. Use of the anchor-free detection head will not need to rely on a prior box, which simplifies the design and implementation of an algorithm, such that the complexity of the prior box is reduced in such a way, that it automatically learns the position and size of an object through network, the anchor-free dual-head detection head can combine object detection with semantic segmentation to improve the accuracy of the object detection. By calculating the intersection over union of the object detection and semantic segmentation, a DIoU value is influenced to improve the detection of an occluded object.

DETAILED DESCRIPTION

In order to make the purpose, technical solution and advantages of the present application clearer, the embodiments of the present application will be further described in conjunction with the accompanying drawings.

Figure 1:
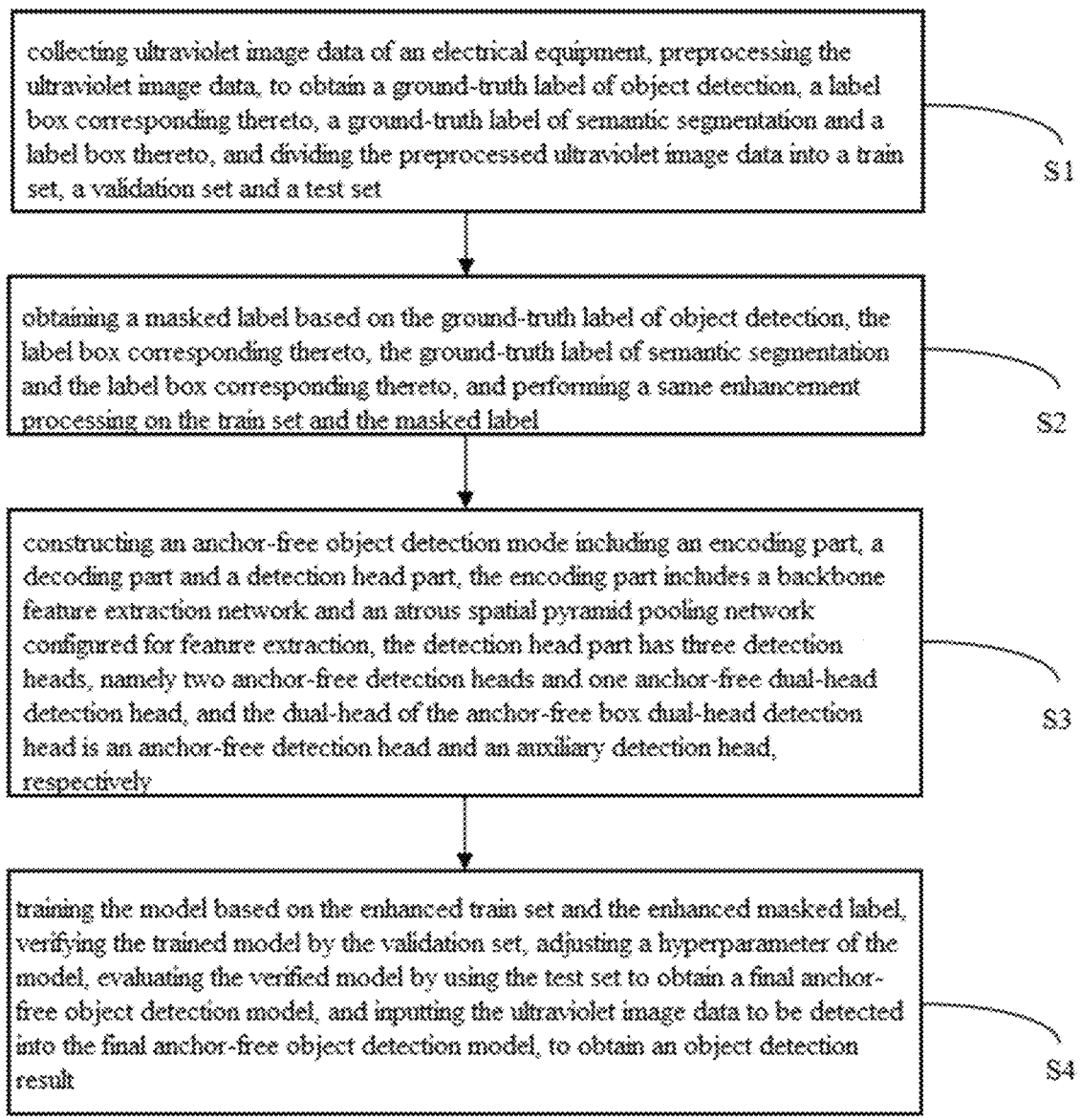
FIG. 1 is a flowchart of an anchor-free object detection method based on ultraviolet image in an embodiment of the present application.

FIG. 1 shows an anchor-free object detection method based on ultraviolet image in an embodiment of the present application, which specifically includes the following steps:

S1 collecting ultraviolet image data of an electrical equipment, preprocessing the ultraviolet image data, to obtain a ground-truth label of object detection and a label box corresponding to the ground-truth label of object detection, a ground-truth label of semantic segmentation and a label box corresponding to the ground-truth label of semantic segmentation, and dividing the preprocessed ultraviolet image data into a train set, a validation set and a test set.

In a further embodiment, preprocessing the ultraviolet image data specifically involves: performing image annotation on the ultraviolet image data by using "labelimg" and "labelme" tools. The "labelimg" is used to create a rectangular label box, to frame and select a target object in the image, the category of the object is annotated in the box, and a final annotation result is saved as a ground-truth label of object detection. The "labelme" tool is used to create a polygon label box, to frame and select an object contour in the image, the category of the object is annotated in the box, and a final annotation result is saved as a ground-truth label of semantic segmentation.

In a further embodiment, the dataset is divided into a train set, a validation set and test set in a ratio of 6:2:2.

S2. Obtaining a masked label based on the ground-truth label of object detection, the label box corresponding to the ground-truth label of object detection, the ground-truth label of semantic segmentation and the label box corresponding to the ground-truth label of semantic segmentation in the train set, and performing a same enhancement processing on the train set and the masked label.

The label box corresponding to the ground-truth label of object detection is compared with the label box corresponding to the ground-truth label of semantic segmentation, to obtain an union set and an intersection set of the two label boxes. A pixel point mask in a zone of the train set image where the union set is removed is set to 0, and a pixel point mask in a zone of the label box corresponding to the ground-truth label of object detection where the intersection zone is removed is set to 1. If the label box corresponding to the ground-truth label of object detection intersects with the label box corresponding to the ground-truth label of semantic segmentation, and the ground-truth label of object detection is consistent with the ground-truth label of semantic segmentation, the pixel point mask in the intersection zone will be set to 2. If the label box corresponding to the ground-truth label of object detection intersects with the label box corresponding to the ground-truth label of semantic segmentation while the ground-truth label of object detection is not consistent with the ground-truth label of semantic segmentation, the pixel point mask in the intersection zone will be set to 3.

S3. Constructing an anchor-free object detection model, the model includes an encoding part, a decoding part and a detection head part. The encoding part includes a backbone feature extraction network and an atrous spatial pyramid pooling network configured for feature extraction. The detection head part has three detection heads including two anchor-free detection heads and one anchor-free dual-head detection head, and the dual-head of the anchor-free dual-head detection head is an anchor-free detection head and an auxiliary detection head, respectively.

The backbone feature extraction network is a backbone feature extraction network based on VGG16 architecture constructed by atrous convolution.

Figure 2:
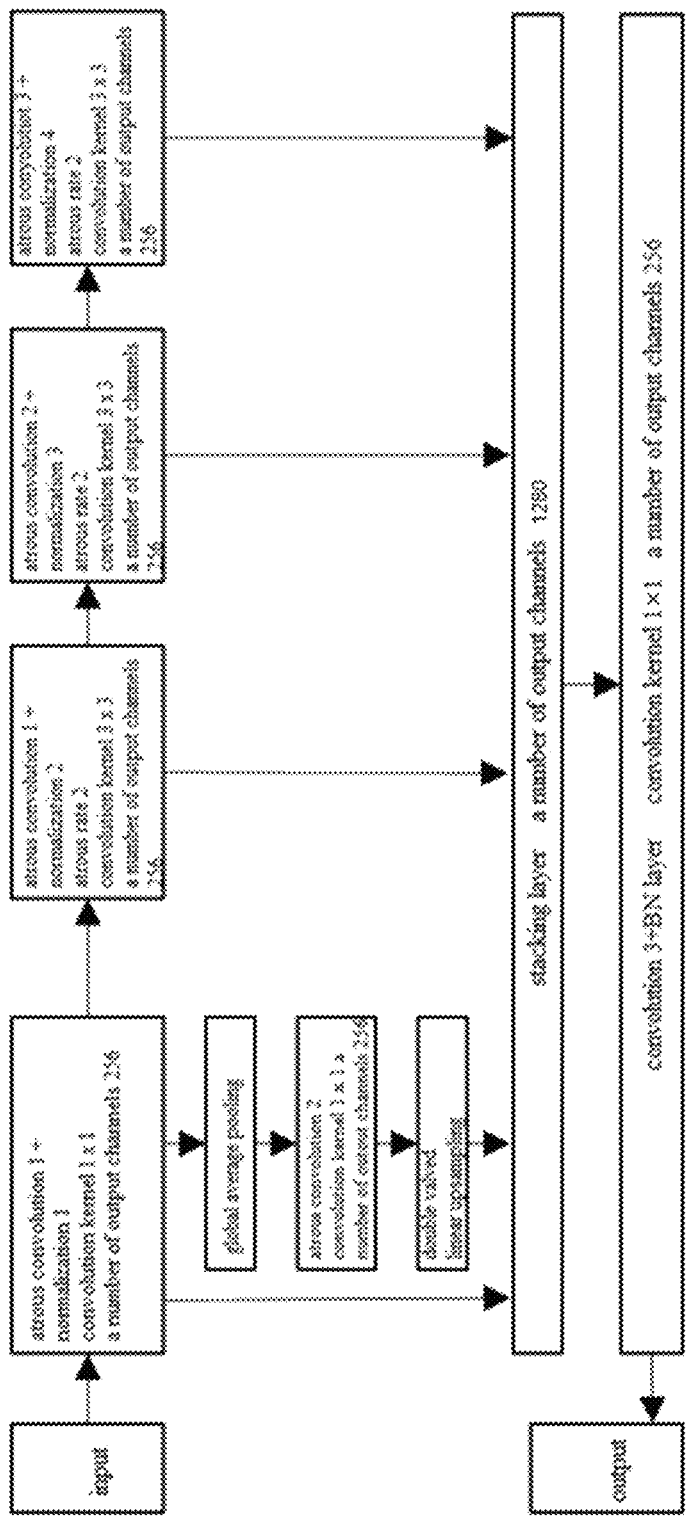
FIG. 2 is a structure chart of an atrous spatial pyramid pooling network in the embodiment of the present application.

The structure of the atrous spatial pyramid pooling network in the embodiment of the present application refers to FIG. 2. The atrous spatial pyramid pooling network includes three convolutions, three atrous convolutions, four normalization layers, one global average pooling layer, one upsampling, one stacking layer and one batch normalization layer.

The first convolution and the first normalization layer constitute the first convolution unit, the first atrous convolution and the second normalization layer constitute the first atrous convolution unit, the second atrous convolution and the third normalization layer constitute the second atrous convolution unit, and the third atrous convolution and the fourth normalization layer constitute the third atrous convolution unit.

The stacking layer has five inputs, an input of the atrous spatial pyramid pooling network, after passing through an output of the first convolution unit, is the first input of the stacking layer. After the first input of the stacking layer passed through the global average pooling layer, the first input of a pooled stacking layer is obtained. After the first input of the pooled stacking layer undergoes the feature extraction by the second convolution, it is upsampled to obtain the second input of the stacking layer. The first input of the stacking layer passes through the first atrous convolution unit, to obtain the third input of the stacking layer. The third input of the stacking layer passes through the second atrous convolution unit, to obtain the fourth input of the stacking layer. The fourth input of the stacking layer passes through the third atrous convolution unit, to obtain the fifth input of the stacking layer.

The five inputs of the stacking layer pass through the stacking layer, to obtain stacked feature maps, the stacked feature maps undergo a feature extraction through the third convolution and pass through the batch normalization layer, such that a new feature is output from the atrous spatial pyramid pooling network.

In a further embodiment, the convolution kernel of each of the three convolutions is 1×1 and the number of output channels is 256; the dilation rate of each of the three atrous convolutions is 2, the convolution kernel is 3×3, and the number of output channels is 256; the output channel of the stacking layer is 1280.

The anchor-free detection head adopts two ordinary convolution operations for feature adjustment, and the number of the channels is adjusted to C1 through one ordinary convolution operation, to obtain the output. The auxiliary detection head adopts two ordinary convolution operations for feature adjustment, and the number of the channels is adjusted to C2 through one ordinary convolution operation, to obtain an output.

The number of the channels of the anchor-free detection is C1=C+4+1, and the number of the channels of the auxiliary detection head is C2=C+1, by which 4 represents four channels that store the position of the bounding box($w_1$, $w_2$, $h_1$, $h_2$), $w_1$ represents a distance between a pixel point and a left border, $w_2$ represents a distance between a pixel point and a right border, $h_i$ represents a distance between a pixel point and a top border, $h_2$ represents a distance between a pixel point and a bottom border, 1 represents one channel that stores a deviation between a pixel point and a center point of a ground-truth box, C is an object type that can be detected, and stores a binary confidence of a corresponding type classification;
Deviation:

$$\text{Drift}_{rate} = \frac{1}{2}\left[\left(\frac{w_1 - w_2}{w_1 + w_2}\right)^2 + \left(\frac{h_1 - h_2}{h_1 + h_2}\right)^2\right].$$

The detection head adopts two methods, NIoU and DIOU, to filter the forecast results of the model and obtain the final results.

In DIOU, in addition to calculation of an IoU value between detection boxes, a distance between detection boxes is further considered. For two overlapping detection boxes, if their IoU values exceed a certain threshold and the distance between them is relative short, only the detection boxes with larger IoU values will be retained, and the detection boxes with smaller IoU values will be suppressed. This can ensure the more representative detection results can be selected and redundancy can be reduced.

$$\text{NIoU} = \min(\cap_1, \cap_2)/\max(\cap_1, \cap_2) \times \text{DIoU}$$

NIoU represents a composite intersection over union, $\cap_1$ represents an intersection part when a ground-truth box of the label box corresponding to the ground-truth label of object detection intersects with a ground-truth box of the label box corresponding to the ground-truth label of semantic segmentation and the ground-truth label of object detection is consistent with the ground-truth label of semantic segmentation, $\cap_2$ represents an intersection part when the ground-truth box of the label box corresponding to the ground-truth label of object detection intersects with the forecast box of the label box corresponding to the ground-truth label of semantic segmentation and the ground-truth label of object detection is consistent with the ground-truth label of semantic segmentation, and DIoU represents a distance intersection over union.

Loss functions of the anchor-free object detection model include a loss function of the anchor-free detection head and a loss function of the auxiliary forecast head, the loss function of the anchor-free detection head includes classification loss and bounding box loss.

The classification loss in the anchor-free detection head is a binary classification, and the nth (n lies in a range of 1~C) channel represents the binary classification of the nth category, a binary loss function of the pixel point in the anchor-free detection head of the anchor-free dual-head detection head is:

$$F_L(P_l, P_p) = -(\alpha(1-P_p)^{\lambda_i} P_l \log P_p) + ((1-\alpha)(1-P_l)^{\lambda_i} P_p \log(1-P_p))$$

$$P_p = P_{pre} \times (1 - \text{Drift}_{rate})$$

$P_p$ is a weighted output confidence of a pixel point, $P_{pre}$ is an output of the anchor-free detection head, $P_l$ is a ground-true label, $F_L(P_l, P_p)$ is the binary loss function of a pixel point, and $\alpha$ is a learnable balance parameter. By setting a hyperparameter $\lambda_i$ corresponding to the mask 0-3, an attention of the anchor-free detection head of the anchor-free dual-head detection head to different zones is adjusted.

S4. Training the model based on the enhanced train set and the enhanced masked label, verifying the trained model by using the validation set, adjusting the hyperparameter of the model, evaluating the verified model by using the test set, to obtain a final anchor-free object detection model, inputting the ultraviolet image data to be detected into the final anchor-free object detection model, and mapping the output to the image for DIoU-NMS (non maximum suppression) and NIoU-NMS (non maximum suppression), to obtain a final forecast result.

The present application further provides a computer-readable storage medium, a computer program is stored in the computer-readable storage medium, and when the computer program is executed by a processor, the above-mentioned anchor-free object detection method based on ultraviolet image is implemented.

The present application further provides an electrical equipment, including a processor and a memory, the processor is interconnected with the memory, the memory is configured to store a computer program, the computer program includes computer-readable instructions, and the processor is configured to call the computer-readable instructions to execute the above-mentioned anchor-free object detection method based on ultraviolet image.

In an exemplary embodiment, a computer-readable storage medium is included, a computer program is stored in the computer-readable storage medium, and when the computer program is executed by the processor, the above-mentioned anchor-free object detection method based on ultraviolet image is implemented.

Figure 3:
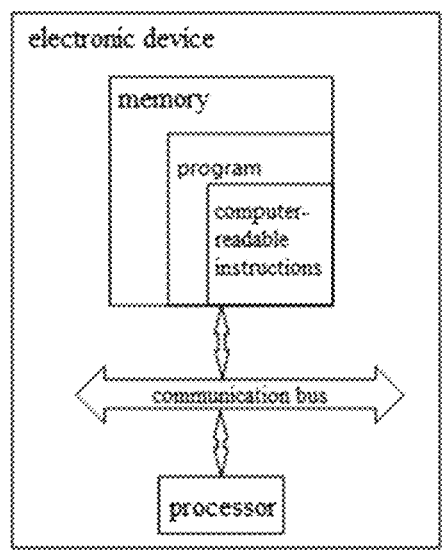
FIG. 3 is a block diagram of an electrical equipment in an exemplary embodiment of embodiment 1 of the present application.

In an exemplary embodiment referring to FIG. 3, an electrical equipment is included, including at least one processor, at least one memory and at least one communication bus.

A computer program is stored in the memory, which includes computer-readable instructions, the processor calls the computer-readable instructions stored in the memory through the communication bus and executes the above-mentioned anchor-free object detection method based on ultraviolet image.

Figure 4:
FIG. 4 is a process diagram of insulator detection by means of the method in the embodiment of the present application.
Figure 5:
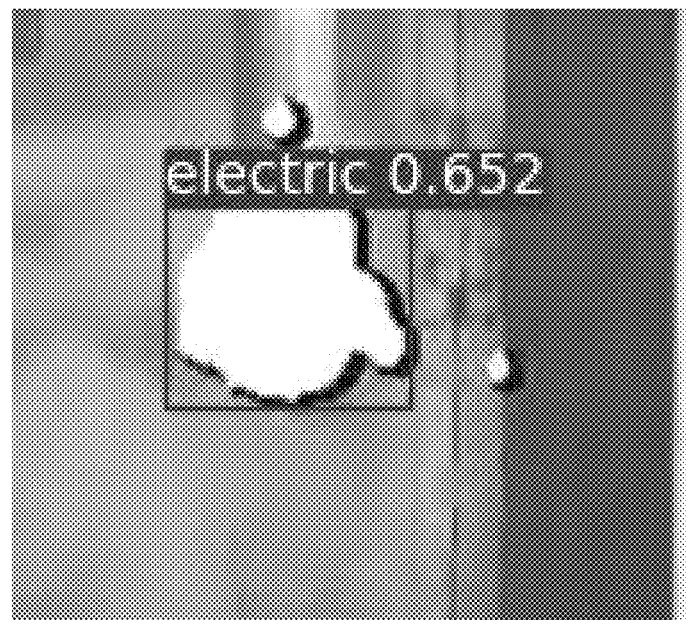
FIG. 5 is a process diagram of corona discharge detection by means of the method in the embodiment of the present application.
Figure 6:
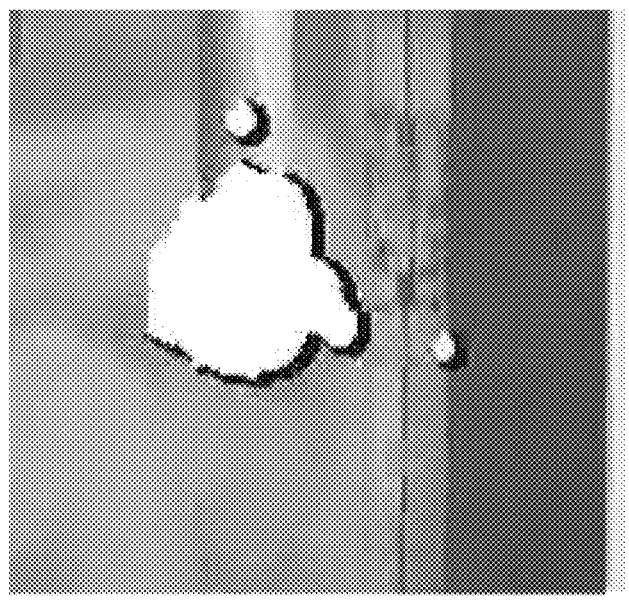
FIG. 6 is a corona discharge diagram of an electrical equipment captured by an ultraviolet equipment in the embodiment of the present application.

The anchor-free object detection method based on ultraviolet image mentioned above is used to detect corona discharge on the electrical equipment. The detection process in which insulators are detected by using the method of the present application refers to FIG. 4, the box in FIG. 4 is an insulator detection box, the symbol above the detection box is the name of an object to be detected, and the number represents a probability of the object. The process in which the corona discharge is detected by using the method in the present application refers to FIG. 5. The central box is a discharge detection box, the symbol above the detection box is the name of the object to be detected, and the number represents the probability of the object. An electrical corona discharge diagram captured by an ultraviolet equipment in the embodiment of the present application refers to FIG. 6, with a discharge zone in a center of the box in FIG. 6. By using the method of the present application, it is determined that the electrical equipment in the diagram is in an abnormal state, and the abnormal parts of the electrical equipment can be located based on the discharge zone.

Being in the abnormal state may be caused by the following reasons:

Aging or damage of the insulation material of the equipment: after a long-term use, the insulation material of the equipment may age or be damaged, which leads to a decrease in insulation capacity, thereby causing corona discharge. The surface of the equipment surface is polluted. The surface of the equipment is accumulated with dust, oil and other pollutants, which will cause corona discharge.

The above explanation of the disclosed embodiments enables those skilled in the art to implement or use the present application. The various modifications to these embodiments will be apparent to those skilled in the art, and the general principles defined in the present application can be implemented in other embodiments without departing from the spirit or scope of the present application. Therefore, the present application shall not be limited to the embodiments shown in the present application, but shall conform to the widest range consistent with the principles and novel features disclosed herein.

What is claimed is:

1. An anchor-free object detection method based on ultraviolet image, comprising the following steps:

S1. collecting ultraviolet image data of an electrical equipment, preprocessing the ultraviolet image data, to obtain a ground-truth label of object detection, a label box corresponding to the ground-truth label of object detection, a ground-truth label of semantic segmentation and a label box corresponding to the ground-truth label of semantic segmentation, and dividing the preprocessed ultraviolet image data into a train set, a validation set and a test set, S2. obtaining a masked label based on the ground-truth label of object detection, the label box corresponding to the ground-truth label of object detection, the ground-truth label of semantic segmentation and the label box corresponding to the ground-truth label of semantic segmentation in the train set, and performing a same enhancement processing on the train set and the masked label, S3. constructing an anchor-free object detection model, wherein the anchor-free object detection model comprises an encoding part, a decoding part and a detection head part, the encoding part comprises a backbone feature extraction network and an atrous spatial pyramid pooling network configured for feature extraction, the detection head part has three detection heads, namely two anchor-free detection heads and one anchor-free dual-head detection head, and the dual-head of the anchor-free box dual-head detection head is an anchor-free detection head and an auxiliary detection head, respectively, and S4. training the anchor-free object detection model based on the enhanced train set and the enhanced masked label, verifying the trained anchor-free object detection model by using the validation set, adjusting a hyperparameter of the anchor-free object detection model, evaluating the verified anchor-free object detection model by using the test set to obtain a final anchor-free object detection model, and inputting the ultraviolet image data to be detected into the final anchor-free object detection model, to obtain an object detection result, wherein the S2 comprises: comparing the label box corresponding to the ground-truth label of object detection with the label box corresponding to the ground-truth label of semantic segmentation, to obtain an union set and an intersection set of the label box corresponding to the ground-truth label of object detection and the label box corresponding to the ground-truth label of semantic segmentation, wherein a pixel point mask in a zone of an image of the train set where the union set is removed is set to 0, a pixel point mask in a zone of the label box corresponding to the ground-truth label of object detection where the intersection zone is removed is set to 1, wherein when the label box corresponding to the ground-truth label of object detection intersects with the label box corresponding to the ground-truth label of semantic segmentation and the ground-truth label of object detection is consistent with the ground-truth label of semantic segmentation, the pixel point mask in the intersection zone is set to 2, and when the label box corresponding to the ground-truth label of object detection intersects with the label box corresponding to the ground-truth label of semantic segmentation while the ground-truth label of object detection is not consistent with the ground-truth label of semantic segmentation, the pixel point mask in the intersection zone is set to 3, wherein loss functions of the anchor-free object detection model comprise a loss function of anchor-free detection head and a loss function of auxiliary forecast head, the loss function of anchor-free detection head comprises classification loss and bounding box loss, wherein a binary loss function of a pixel point of anchor-free detection head of the anchor-free dual-head detection head is:

$$F_L(P_l, P_p) = -\left(\alpha(1-P_p)^{\lambda_i} P_l \log P_p\right) + \left((1-\alpha)(1-P_l)^{\lambda_1} P_p \log(1-P_p)\right)$$

$$P_p = P_{pre} \times (1 - \text{Drift}_{rate})$$

$$\text{Drift}_{rate} = \frac{1}{2}\left[\left(\frac{w_1 - w_2}{w_1 + w_2}\right)^2 + \left(\frac{h_1 - h_2}{h_1 + h_2}\right)^2\right],$$

wherein $P_p$ is a weighted output confidence of a pixel point, $P_{pre}$ is an output of the anchor-free detection head, $P_l$ is a ground-true label, $F_L(P_l, P_p)$ is the binary loss function of a pixel point, and $\alpha$ is a learnable balance parameter, $i \in (0,3)$, by setting a hyperparameter $\lambda_i$ corresponding to a mask 0-3, an attention of the anchor-free detection head of the anchor-free dual-head detection head to different zones is adjusted, $\text{Drift}_{rate}$ represents a deviation, $w_1$ represents a distance between a pixel point and a left border, $w_2$ represents a distance between a pixel point and a right border, $h_1$ represents a distance between a pixel point and a top border, and $h_2$ represents a distance between a pixel point and a bottom border.

2. The anchor-free object detection method based on ultraviolet image according to claim 1, wherein in the S1, the label box corresponding to the ground-truth label of object detection is a rectangular label box, and the label box corresponding to the ground-truth label of semantic segmentation is a polygonal label box.

3. The anchor-free object detection method based on ultraviolet image according to claim 1, wherein the backbone feature extraction network is a backbone feature extraction network based on VGG16 architecture constructed by atrous convolution.

4. The anchor-free object detection method based on ultraviolet image according to claim 1, wherein the atrous spatial pyramid pooling network comprises three convolutions, three atrous convolutions, four normalization layers, one global average pooling layer, one upsampling, one stacking layer and one batch normalization layer, wherein a first convolution and a first normalization layer constitute a first convolution unit, a first atrous convolution and a second normalization layer constitute a first atrous convolution unit, a second atrous convolution and a third normalization layer constitute a second atrous convolution unit, and a third atrous convolution and a fourth normalization layer constitute a third atrous convolution unit, wherein the stacking layer has five inputs, an input of the atrous spatial pyramid pooling network, after passing through an output of the first convolution unit, is the first input of the stacking layer, after the first input of the stacking layer passes through the global average pooling layer, a first input of a pooled stacking layer is obtained, the first input of the pooled stacking layer, after undergoing a feature extraction by the second convolution, is upsampled to obtain a second input of the stacking layer, the first input of the stacking layer passes through the first atrous convolution unit, to obtain a third input of the stacking layer, the third input of the stacking layer passes through the second atrous convolution unit, to obtain a fourth input of the stacking layer, and the fourth input of the stacking layer passes through the third atrous convolution unit, to obtain a fifth input of the stacking layer, the five inputs of the stacking layer pass through the stacking layer, to obtain stacked feature maps, the stacked feature maps undergo a feature extraction through the third convolution and pass through the batch normalization layer, such that a new feature is output from the atrous spatial pyramid pooling network.

5. The anchor-free object detection method based on ultraviolet image according to claim 1, wherein the anchor-free detection head of the anchor-free dual-head detection head adopts two first ordinary convolution operations for feature adjustment, a number of channels of the anchor-free detection head of the anchor-free dual-head detection head is adjusted to C1 through one of the two first ordinary convolution operations, to obtain a first output, the auxiliary detection head adopts two second ordinary convolution operations for feature adjustment, and a number of channels of the auxiliary detection head is adjusted to C2 through one of the two second ordinary convolution operations, to obtain a second output, the number of the channels of the anchor-free detection head of the anchor-free dual-head detection head is C1=C+4+1, the number of the channels of the auxiliary detection head is C2=C+1, wherein 4 represents four channels that store a position of a bounding box ($w_1$, $w_2$, $h_1$, $h_2$), $w_1$ represents a distance between a pixel point and a left border, $w_2$ represents a distance between a pixel point and a right border, $h_1$ represents a distance between a pixel point and a top border, $h_2$ represents a distance between a pixel point and a bottom border, 1 represents one channel that stores a deviation between a pixel point and a center point of a ground-truth box, C is a detectable object type, and stores a binary confidence of a corresponding type classification.

6. The anchor-free object detection method based on ultraviolet image according to claim 5, wherein the anchor-free dual-head detection head adopts two methods, namely NIoU and DIOU, to filter model forecast results and obtain final results, $$NIoU = \min(\cap_1, \cap_2)/\max(\cap_1, \cap_2) \times DIoU$$

wherein NIoU represents a composite intersection over union, $\cap_1$ represents a first intersection part when a ground-truth box of the label box corresponding to the ground-truth label of object detection intersects with a ground-truth box of the label box corresponding to the ground-truth label of semantic segmentation and the ground-truth label of object detection is consistent with the ground-truth label of semantic segmentation, $\cap_2$ represents a second intersection part when the ground-truth box of the label box corresponding to the ground-truth label of object detection intersects with the forecast box of the label box corresponding to the ground-truth label of semantic segmentation and the ground-truth label of object detection is consistent with the ground-truth label of semantic segmentation, and DIoU represents a distance intersection over union.

7. An electrical equipment, comprising a processor and a memory, wherein the processor is interconnected with the memory, wherein the memory is configured to store computer-readable instructions, and the processor is configured to call the computer-readable instructions, and execute the anchor-free object detection method based on ultraviolet image according to claim 1.

\* \* \* \* \*